April 12, 1932.  G. B. EGGERT  1,853,967
WEIGHING MACHINE
Filed May 14, 1928   2 Sheets-Sheet 1

INVENTOR
GUSTAV B. EGGERT
BY George B. Willcox
ATTORNEY

April 12, 1932.  G. B. EGGERT  1,853,967
WEIGHING MACHINE
Filed May 14, 1928  2 Sheets-Sheet 2
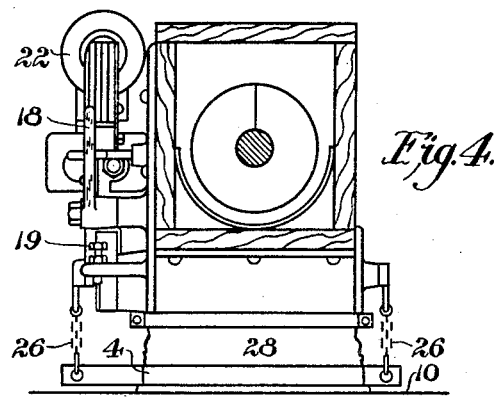
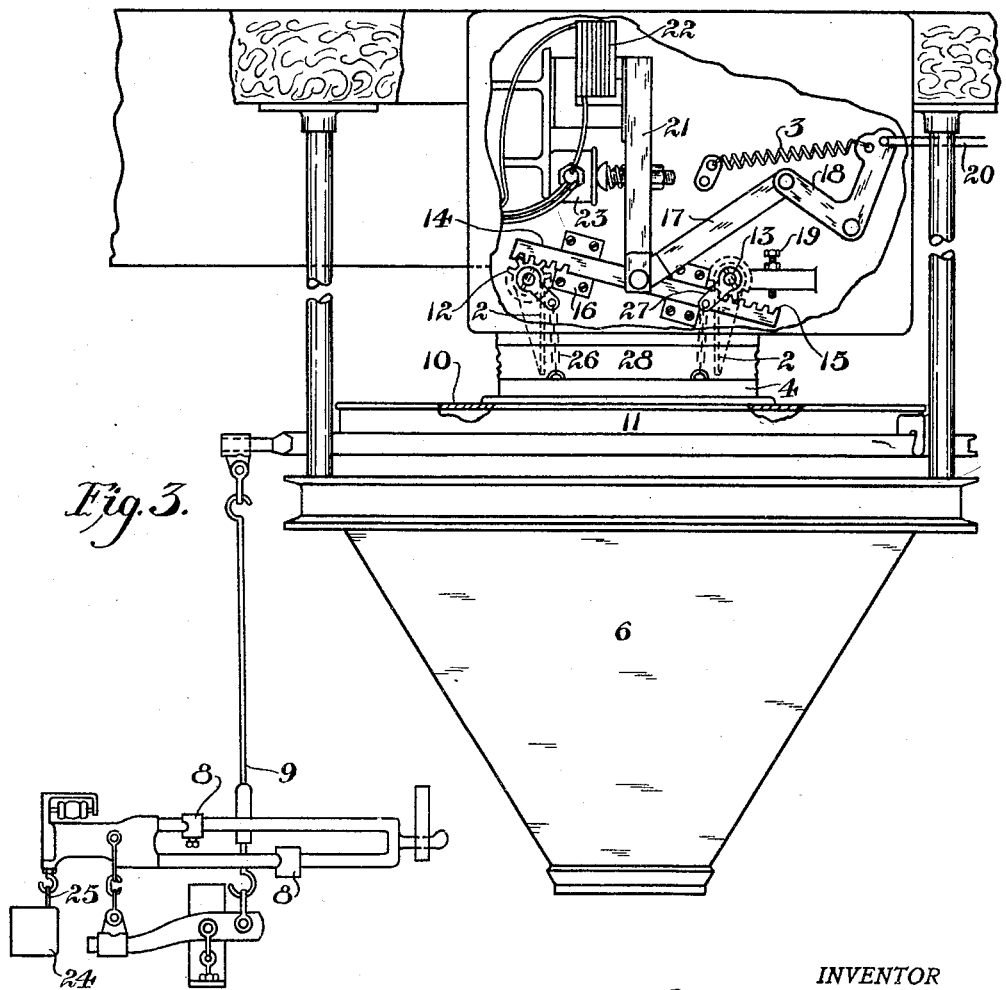
INVENTOR
GUSTAV B. EGGERT
BY
ATTORNEY Patented Apr. 12, 1932

1,853,967

UNITED STATES PATENT OFFICE

GUSTAV B. EGGERT, OF SAGINAW, MICHIGAN, ASSIGNOR TO BAKER PERKINS COMPANY, INC., OF SAGINAW, MICHIGAN, A CORPORATION OF NEW YORK

WEIGHING MACHINE

Application filed May 14, 1928. Serial No. 277,660.

This invention relates to automatic weighing machines that receive material such as sugar or flour from a hopper or conveyor and divide it into portions of equal predetermined weight.

A problem solved by my invention is to provide means controlled by the weighing mechanism whereby the conveyor is stopped and all further supply from it is cut off by snapping a gate shut when the scale beam moves under a load of material that equals the weight of a desired unit charge minus the weight of the suspended stream.

Applying to the conveyor a gate to snap shut the instant the conveyor motor circuit is broken assures that coasting of the conveyor or dribbling due to the jarring of the mechanism will not add any more material to the hopper. The suspended stream is therefore delivered into the hopper as a known uniform weight at the end of each weighing operation.

The invention further provides means whereby the operator by a single movement can set or position the scale mechanism for accomplishing the above results and also start the conveyor.

Another problem is to cause the balancing mechanism of the scale to automatically reset itself in the midst of a weighing operation whereby the scale indicator comes into position of normal balance after the suspended stream falls in the hopper. The balancing of the scale thus provides a visual check on the accuracy of the completed weighing operation.

Prior to this invention if, for example, the operator desired to weigh units of one hundred pounds net he would customarily set the scale to trip at, say, ninety four pounds and had to guess that the additional six pounds of suspended stream was correctly delivered. The scale itself provided no means of visually checking the accuracy of weighing because the beam which had been set for ninety four pounds in order to shut the gate at that point would not be in balance when the suspended stream was added to make up the correct load of one hundred pounds net.

Moreover, if the operator desired to shift to charges of, say, one hundred fifty pounds each, he was very likely to forget the suspended stream correction of six pounds and set the beam for one hundred fifty pounds instead of one hundred forty four pounds as he should. Errors of that kind are serious, especially in bakery practice where flour is being weighed.

With this invention the operator is less likely to make mistakes when adjusting his weighing machine to deliver specified weights. If, for example, he wishes to deliver charges of one hundred pounds each, made up on ninety-four pounds in the pan and six pounds which is in the suspended stream at the instant of cut-off, he sets the scale straightaway to balance at one hundred pounds and although the scale beam moves and the stream cuts off with ninety four pounds of material in the hopper the readjustment of six pounds automatically takes place and compensates for the suspended stream, thus balancing the beam at the completion of each operation.

Another object is to utilize the frame of the usual canvas dust-guard as an auxiliary or balance readjusting weight during the weighing operation. This feature of the claimed invention is not confined in its application to beam scales, for it can also be used on dial scales.

In addition to the prime objects of the invention above set forth certain features of claimed novelty are inherent in the concrete means for actuating the cut-off gates and the dust-guard so that when the gates are snapped shut to cut off the suspended stream, the dust-guard automatically lifts clear of the scale pan or hopper.

With the foregoing and certain other objects in view, which will appear later in the specification, my invention comprises the devices described and claimed and the equivalents thereof.

Although a beam scale has been chosen for purposes of description, it will be obvious that the invention as claimed is applicable to the spring balance or dial type of weighing machine.

In the drawings Fig. 1 is a diagrammatic view showing a symbolic scale beam and pan or hopper in process of being filled and a typical wiring diagram of the electric circuits employed in their operation.

Fig. 3 is a part sectional side elevation of the mechanism in its preferred form.

Fig. 4 is an end view of the supply mechanism.

Figures 1, 2:
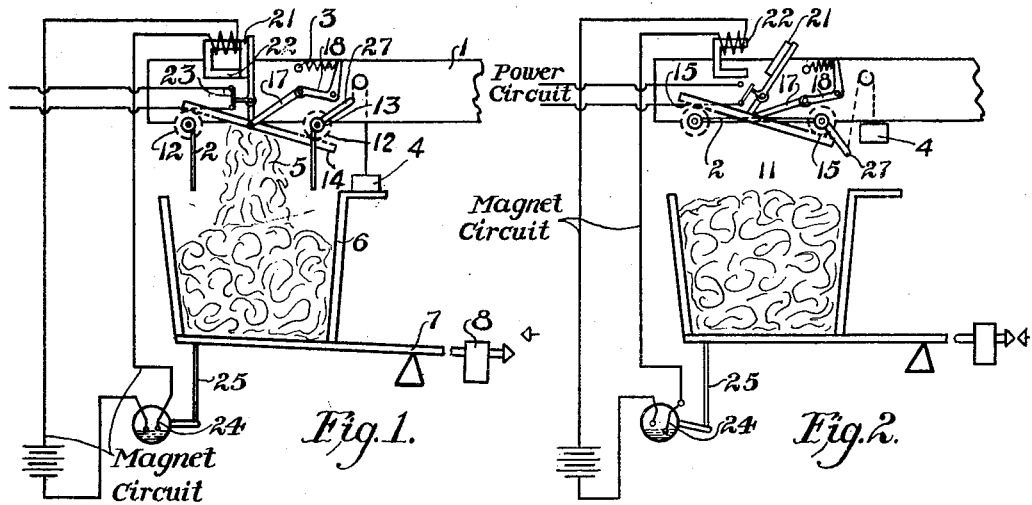
Fig. 2 is a similar view showing a unit charge in the scale pan, the beam balanced.

As is clearly shown in the drawings the weigh scale has for its supply source a conveyor 1, a hopper, or the like, whose outlet is provided with a cut-off gate 2 adapted to be snapped shut by weight action or by a spring 3 which is released upon movement of the balancing mechanism of the scale.

In addition to the use of a snap cut-off gate to prevent dribbling after the conveyor circuit is broken the invention is further characterized by the use of an auxiliary weight element 4 or 4a whose weight is equal to or proportional to the weight of the suspended stream 5 at the moment of cut-off.

The function of the auxiliary weight is that of a balance-adjusting device. It can be used in either of two manners, firstly, by making it exactly equal in weight to the ascertained weight of the suspended stream, placing it on the scale pan or hopper as in Fig. 1 and then loading with material until the beam rises and the cut-off gate shuts. Thereupon a device operatively connected to the gate 2 and controlled by the scale mechanism removes the auxiliary weight from the scale, leaving the scale free to balance at the required net amount after the suspended stream has fallen into the pan 6.

The second named embodiment of the device is characterized by what is substantially the opposite of the above operation, namely, loading the pan until the beam rises, then cutting off the supply by gate 2 and by breaking the power circuit to the conveyor and simultaneously adding an auxiliary weight element 4a to the weight end of the beam to cause the scale to balance at the required net amount after the suspended stream has fallen. Here again the beam is seen to be balanced at the correct net weight when the operation is finished.

The two embodiments of the auxiliary weight feature of the invention are differentiated from each other by the fact that in the first case the readjustment of the balancing weight is made by automatically removing from the scale pan, as soon as the preliminary balance is momentarily reached, an amount 4 equal to the known weight of the suspended stream; and in the second case by adding a proportional amount 4a to the weight end of the scale beam. Both operations produce the same result and both are included within the scope of some of the claims.

The scale mechanism will now be described with reference to structural details.

The balancing beam 7 of usual type is suspended on gimbals and provided with adjustable weights 8 and steelyard rod 9. The pan 6 is preferably in the form of a hopper suspended in the usual way by means of gimbals. It is provided with a cover 10 having a central opening 11 through which the stream of material enters from the source of supply 1. The mouth of the conveyor or hopper is provided with the pair of spring actuated gates 2 that can be released by trigger action to snap shut instantaneously.

The improved gate closing means includes a power spring or equivalent device that is magnetically released through the agency of the scale mechanism. Between the power spring and the gate is a novel arrangement of gate actuating levers whereby the gate when closed is kept from opening until the levers are released. The gate may be a single leaf or valve, but is preferably in the form of a pair of hinged leaves pivotally mounted on a stationary support. The gate can be opened and closed by any suitable means, for example, pinions 12 secured to the hinge pintles 13. The pinions of the leaves are operated by a bar 14 that has a toothed rack 15 at each end to engage the cooperative pinion. When moved lengthwise the bar 14 turns one of the pinions 12 in one direction, the other in the opposite direction, simultaneously shutting or opening the two leaves of the gate.

Stationary guides 16 support the bar which is moved lengthwise back and forth by means of a link 17 pivoted at one end to the bar. The other end of the link is pivoted to an arm 18 of a bell crank lever that is fulcrumed to a fixed support. To the other arm of the bell crank is connected power spring 3, the manual tensioning of which furnishes the power for closing the gate.

The relative positions of the link 17 and arm 18 of the bell crank lever are such that when the gates are closed the link and crank are positioned slightly beyond their dead center where an abutment screw 19 is provided to limit the movement of the joint, thus locking the gates by toggle action.

To the upper end of the bell crank lever is fitted a cord 20 which, pulled by the operator, tensions the spring and opens the gate.

The gate is held in opened position by an arm 21 whose free end is restrained by an electro-magnet 22. When the magnetic circuit is broken the magnet releases the arm 21 and the spring tension snaps the gate shut, acting through the bell crank and link. While the upright arm is held against the magnet it holds closed a power circuit switch 23 through which current is supplied to the motor that operates the material conveyor. Therefore, while the magnet is restraining the arm 21 the supply gate is open and material is pouring from the conveyor into the scale hopper 6, and when the magnet releases the arm the spring snaps the gate shut and the conveyor stops.

The current that passes through the magnet also traverses a switch 24 of any suitable type, but for illustration I have selected the usual rotary mercury tube design. The tube is delicately balanced and is slightly rotated by the action of the scale beam when the increasing load causes it to rise from its lowest position to its balancing position. A fine wire link 25 connects the scale beam and the switch-actuating elements.

When the operator opens the supply gate and tensions the spring by pulling the cord 20 he thereby also closes the power circuit, starting the supply motor. When the scale beam begins to move up to its balanced position it operates the switch 24 to break the circuit of the magnet 22 which releases the arm 21 and permits it to fly backward, impelled by the spring, snapping the gate shut. Weight 4 can be conveniently made as shown in Fig. 3 in the form of a frame slightly larger than the opening 11 in the hopper cover 10 and adapted to rest upon it or to be lifted therefrom by means of a flexible connection such as chains 26 connected to arms 27 on the hinge pintles 13 of the wings of the gate. Each time the gate is snapped shut the auxiliary weight 4 is automatically lifted from the scale hopper. In the present case the frame weight 4 is not merely proportional, but is exactly equal to the known weight of the suspended stream.

Figures 5, 6:
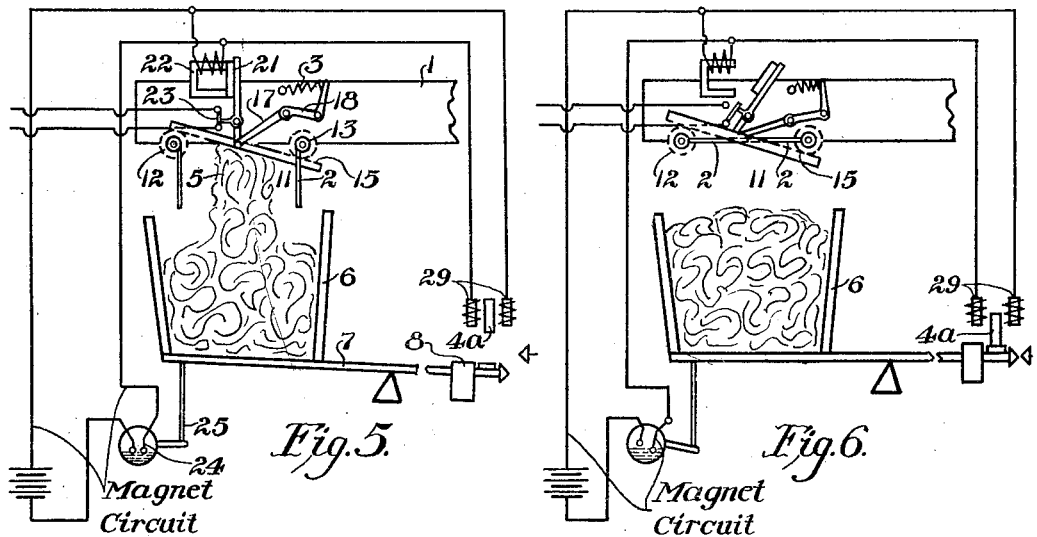
Figs. 5 and 6 are views similar to Figs. 1 and 3, showing the invention in modified form.

The frame may be utilized as a hoop to which the bottom edge of the dust-guard is attached. The dust-guard is a cloth spout 28 and is commonly employed to connect the source of supply and the hopper to prevent escape of dust and to guide the material into the hopper. A convenient means for applying and removing the auxiliary weight 4a from the free end of the scale beam is illustrated in Figs. 5 and 6, where the weight is in the form of a solenoid bar applied to the beam or held clear of it by a solenoid coil 29 in circuit with the mercury switch 24 so that when the switch breaks the circuit the auxiliary weight 4a will be released and allowed to rest on the beam.

The circuits shown diagrammatically in Figs. 1, 2, 5 and 6 are those commonly employed in work of this kind.

Having thus described my invention what I claim and desire to secure by Letters Patent is:

1. In combination a scale having a hopper, a supply conveyor, a hinged delivery gate for the conveyor, a pinion on the pintle of said gate, a bar having a toothed rack meshing with said pinion, a link pivoted to said bar, a bell crank lever having an arm pivoted to said link to constitute a toggle, an actuating spring for said toggle and means controlled by the scale mechanism for releasing said spring and for simultaneously stopping the motor.

2. In combination with an automatic weigh scale having a supply source and a cut-off gate adapted to be tripped by the balancing mechanism of the scale, means for normally holding the cut-off gate, an auxiliary weight element independent of the scale structure and proportional to the weight of the suspended stream during the normal flow thereof, and means controlled by the movement of the scale mechanism for applying said weight element to the scale during a part of the loading operation and for removing it therefrom during another part of the said operation, whereby the scale balance having been initially set to trip the gate when the load equals a stated net amount minus the weight of the normal suspended stream is, after tripping, reset by means of said auxiliary weight element so as to effect final balancing of the scale at the required net weight including the weight of the normal suspended stream.

3. In combination with an automatic weigh scale having a supply source and a cut-off gate having means for normally holding said gate open and adapted to be tripped by the balancing mechanism of the scale, an auxiliary weight element equal to the weight of the suspended stream, and means controlled by the movement of the scale mechanism for applying said weight element to the scale pan during the first part of the loading operation before tripping and for removing it therefrom during the latter part of the said operation after tripping, whereby the scale having been initially set to trip the gate when the load equals a stated net amount minus the weight of the suspended stream is, after tripping, reset by the removal of said auxiliary weight element so as to effect final balancing of the scale at the required net weight after the suspended stream has fallen.

4. A weighing apparatus comprising a supply conveyor having a delivery gate and a scale adjusted to initially balance when holding a mass of material whose weight is a predetermined amount minus that of the suspended stream falling normally from the gate, an independent auxiliary weight element and means, set in motion by the scale mechanism when initially balanced, for so positioning said auxiliary weight element with respect to the scale as to again balance the scale when holding said predetermined amount of material.

5. A weighing apparatus comprising a supply conveyor having a delivery gate and a scale adjusted to initially balance when holding a mass of material whose weight is a predetermined amount minus that of the suspended stream falling normally from the gate, and independent auxiliary weight element initially seated on the material-holding end of said scale and means set in motion by the scale mechanism when initially balanced, for raising said auxiliary weight element clear of the scale whereby to again balance the scale after the material of the suspended stream is added.

6. A machine constructed as set forth in claim 5 wherein the auxiliary weight element comprises the frame of a fabric dust guard surrounding the suspended stream of material.

7. In combination a scale having a pan, a supply conveyor, a hinged delivery gate for the conveyor, an electric circuit having therein an electromagnet operatively connected to said gate to hold it normally open, spring means for suddenly closing the gate upon interruption of said circuit, a dust guard enclosing the suspended stream of material falling from the gate to the pan, said dust guard arranged to exert on the scale pan a weight equal to the weight of the normal suspended stream, lifting means secured to the dust guard and actuated simultaneously with the gate, whereby the weight of the guard is removed from the pan when the spring-actuated gate snaps shut to cut off the suspended stream of material.

8. A weighing apparatus comprising a supply conveyor having a delivery gate and a scale adjusted to initially balance when holding a mass of material whose weight is a predetermined amount minus that of the suspended stream falling normally from the gate, an independent auxiliary weight element initially held free of said scale, and means set in operation by said scale when initially balanced for releasing said auxiliary weight and adding it to the counterpoise side of said scale to again balance the scale after the material of the suspended stream is added.

In testimony whereof, I affix my signature.

GUSTAV B. EGGERT.